United States Patent
Park

(10) Patent No.: US 9,340,244 B2
(45) Date of Patent: May 17, 2016

(54) ZERO FLUSH SYSTEM

(71) Applicant: Hyundai Motor Company, Seoul (KR)

(72) Inventor: Sang Kyu Park, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 383 days.

(21) Appl. No.: 14/065,163

(22) Filed: Oct. 28, 2013

(65) Prior Publication Data

US 2015/0040365 A1 Feb. 12, 2015

(30) Foreign Application Priority Data

Aug. 7, 2013 (KR) .......................... 10-2013-0093536

(51) Int. Cl.
*B62D 65/02* (2006.01)
*B62D 65/06* (2006.01)
*B23P 19/04* (2006.01)

(52) U.S. Cl.
CPC ............... *B62D 65/028* (2013.01); *B23P 19/04* (2013.01); *B62D 65/06* (2013.01); *Y10T 29/4978* (2015.01); *Y10T 29/49785* (2015.01)

(58) Field of Classification Search
CPC ...... B62D 65/028; B62D 65/06; B23P 19/04; Y10T 29/4978; Y10T 29/49785; Y10T 29/49764
USPC .................................................. 29/407.1, 409
See application file for complete search history.

(56) References Cited

FOREIGN PATENT DOCUMENTS

| | | |
|---|---|---|
| JP | 4-42031 A | 2/1992 |
| JP | 5-112127 A | 5/1993 |
| JP | 2008-188636 A | 8/2008 |
| JP | 2009-113645 A | 5/2009 |
| KR | 91-010076 B1 | 12/1991 |
| KR | 1998-036406 U | 9/1998 |
| KR | 2003-0017863 A | 3/2003 |
| KR | 20-2013-0002601 U | 5/2013 |

OTHER PUBLICATIONS

KR 1998036406, Sam-Seok Jang; KIPO English Machine Translation, for Bus Variable Handle Apparatus; Dec. 14, 1996; pp. 1-5.*
JP 2008188636, Nagoshi et al. EPO English Machine Translation, Level Difference Adjusting Jig; Jan. 6, 2016; pp. 1-5.*

* cited by examiner

*Primary Examiner* — David Bryant
*Assistant Examiner* — Bayan Salone
(74) *Attorney, Agent, or Firm* — Morgan, Lewis & Bockius LLP

(57) ABSTRACT

A zero flush system includes a body provided with a plurality of transfer paths, a plurality of solenoid bars movably inserted into the transfer paths and a solenoid bar in the plurality of solenoid bars having one end closely adhered to a vehicle body panel or a door panel, a plurality of solenoids disposed in the transfer paths and transferring the solenoid bars at a time of applying power to the solenoids and a control device controlling the transferring of the solenoid bars.

14 Claims, 8 Drawing Sheets

ZERO FLUSH SYSTEM

CROSS-REFERENCE TO RELATED APPLICATION

The present application claims priority of Korean Patent Application Number 10-2013-0093536 filed on Aug. 7, 2013, the entire contents of which application are incorporated herein for all purposes by this reference.

BACKGROUND OF INVENTION

1. Field of Invention

The present invention relates to a zero flush system, and more particularly, to a zero flush system fixing a door that does not include a striker in order to measure a gap flush of a vehicle body assembling line and making a flush between a vehicle body panel and a door panel zero.

2. Description of Related Art

Generally, both sides of a vehicle are provided with doors so that a driver or a passenger may get on or off the vehicle. The door, which is a component including a plurality of panels jointed to each other and installed with a device, or the like, capable of allowing a window to ascend or descend, is mounted at a side outer panel of a vehicle body 101 while maintaining a predetermined gap from the side outer panel. In order for the door to be smoothly operated without interference when being opened or closed and maintain air-tightness in the vehicle, a flush between a vehicle body panel 1 and a door panel 2 should be very precisely maintained. This flush has been manually measured by a person or has been automatically measured. In order to automatically measure the flush, the door panel 2 that does not include a striker needs to be fixed in an assembling line of the vehicle. In order to fix the door panel 2 and make the flush between the door panel 2 and the vehicle body panel 1 zero or substantially zero, as shown in FIG. 1, an air cylinder 105 or a linear actuator has been used in the prior art.

However, according to the prior art, since the air cylinder 105 or the linear actuator is used as a moving device in measuring the flush, a large volume is occupied in a process, which causes a spatial limitation and teaching interference with a robot. In addition, since the air cylinder 105 or the linear actuator should be installed to be far away from a conveyer 100 or a shuttle transfer line of an assembling process, the air cylinder 105 or the linear actuator moves a long stroke in order to fix the door panel if necessary, thereby delaying a process cycle time.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made to solve the above-mentioned problems and/or other problems occurring in the prior art while advantages achieved by the prior art are maintained intact.

Various aspects of the present invention provide for a zero flush system fixing a door panel that does not include a striker, sensing a flush between a vehicle body panel and the door panel, and making the flush zero.

In one aspect of the present invention, there is provided a zero flush system including: a body provided with a plurality of transfer paths, a plurality of solenoid bars movably inserted into the transfer paths and a solenoid bar in the plurality of solenoid bars having one end closely adhered to a vehicle body panel or a door panel, a plurality of solenoids disposed in the transfer paths and transferring the solenoid bars at a time of applying power thereto, and a control device controlling the transferring of the solenoid bars.

The transfer paths may include a first transfer path formed at a part meeting the vehicle body panel and a second transfer path formed at a part meeting the door panel, and the solenoid bars may include a first solenoid bar inserted into the first transfer path and a second solenoid bar inserted into the second transfer path.

The other end of the solenoid bar may be provided with an elastic member providing elastic force. A buffering member may be disposed between the solenoid bar and the elastic member. The one end of the solenoid bar may be provided with a permanent magnet. The solenoid bar may include a plurality of electromagnet pieces attached to an outer peripheral surface thereof, wherein the electromagnet piece interacts with the solenoid to magnetically float and transfer the solenoid bar.

The body may be detachably mounted at a robot by a jointing device. The jointing device may include a first jointing part mounted at one side of the body and provided with a jointing groove, and a second jointing part mounted at the robot and detachably mounted at the jointing groove.

An inner peripheral surface of the jointing groove may be provided with a fastening groove, the fastening groove may be provided with a fixing piece that is slidable and be provided with a spring providing elastic force so that the fixing piece is directed toward an outer side, and the second jointing part may be provided with a fixing groove into which the fixing piece is inserted. The jointing groove may be provided with a contact sensor sensing jointing between the first and second jointing parts.

In another aspect of the present invention, there is provided a zero flush system including: a disposing step of disposing the zero flush system according to claim 1 at an interface between a vehicle body panel and a door panel, a close adhering step of closely adhering solenoid bars of the zero flush system to the vehicle body panel and the door panel, a measuring step of measuring, by a control device, a flush between the vehicle body panel and the door panel by sensing between the solenoids of the zero flush system and electromagnet pieces of the solenoid bars, and a transferring step of transferring the solenoid bars so as to make the flush between the vehicle body panel and the door panel zero.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
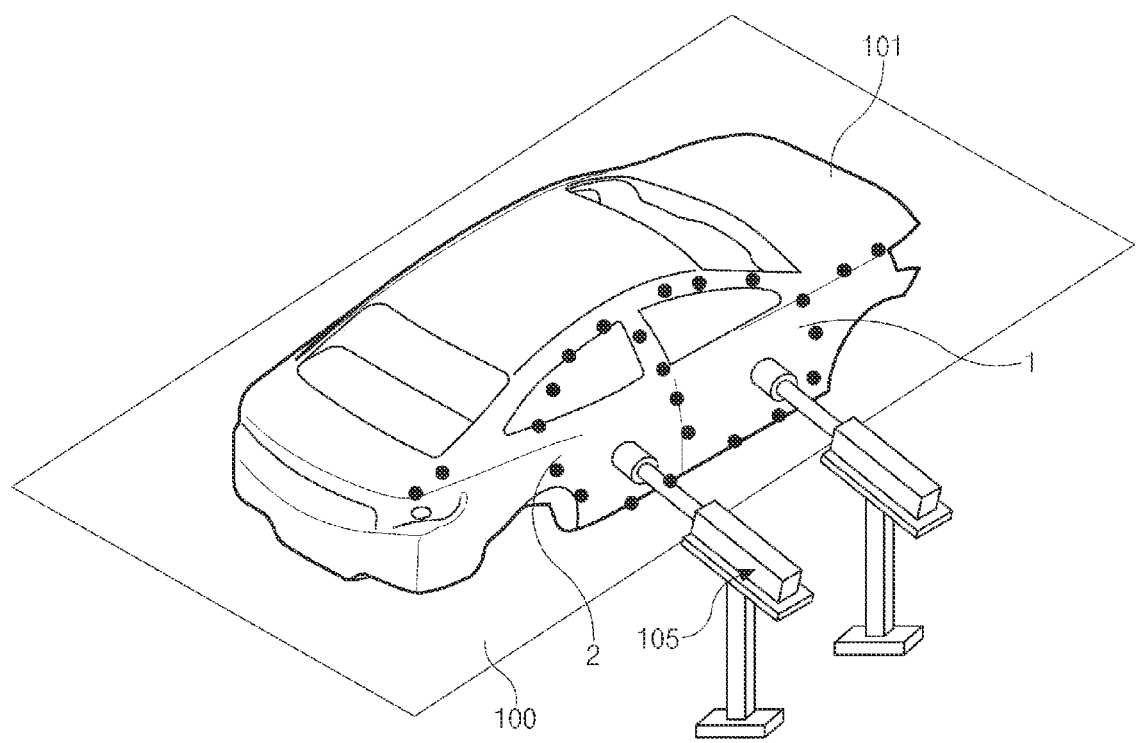
FIG. 1 is a view showing a system for measuring a flush between a vehicle body panel and a door panel according to the prior art.
Figure 2:
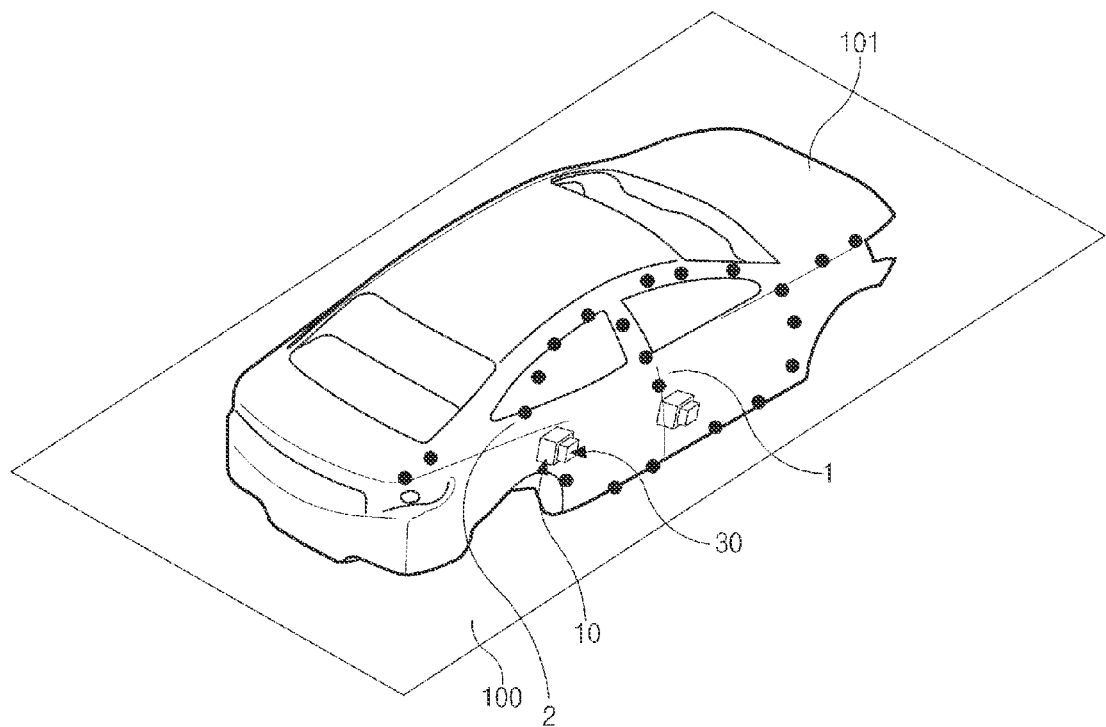
FIG. 2 is a view showing a zero flush system according to the present invention for measuring a flush between a vehicle body panel and a door panel.
Figure 3:
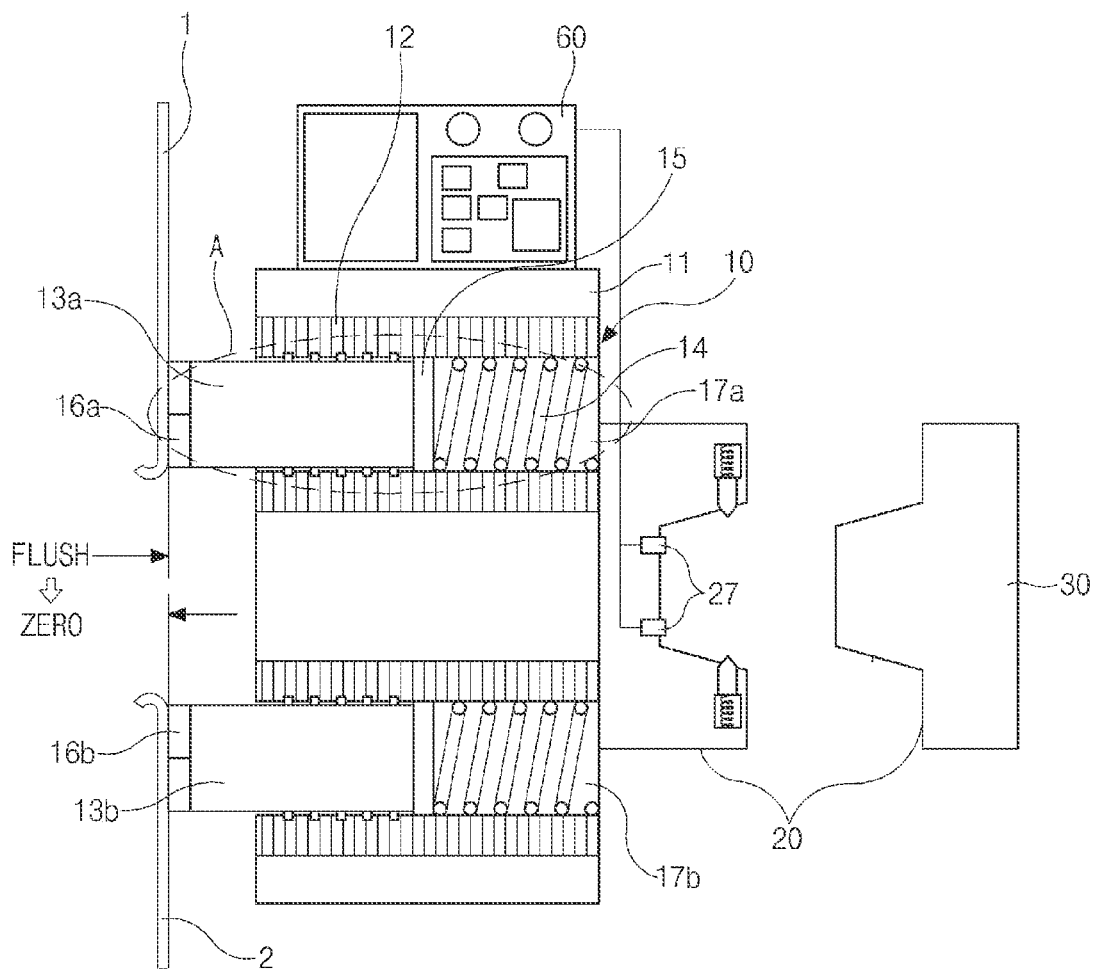
FIG. 3 is a schematic cross-sectional view showing the zero flush system according to the present invention.
Figure 4:
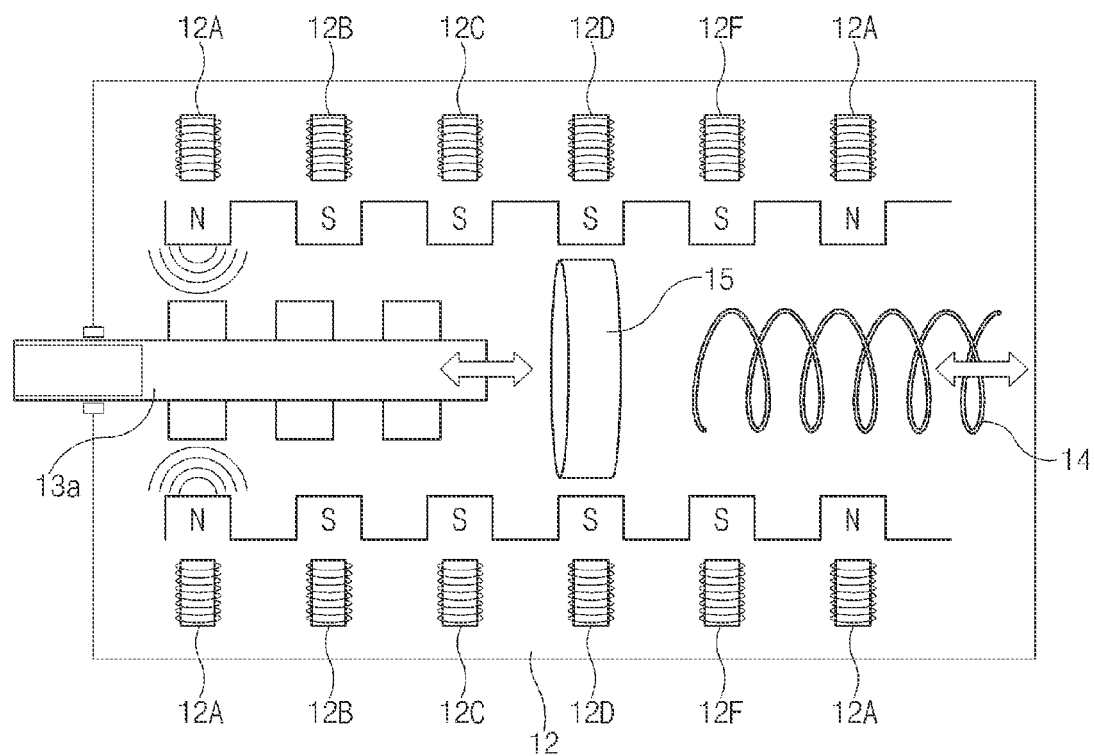
FIG. 4 is a detailed view of the part A of FIG. 3.
Figure 5:
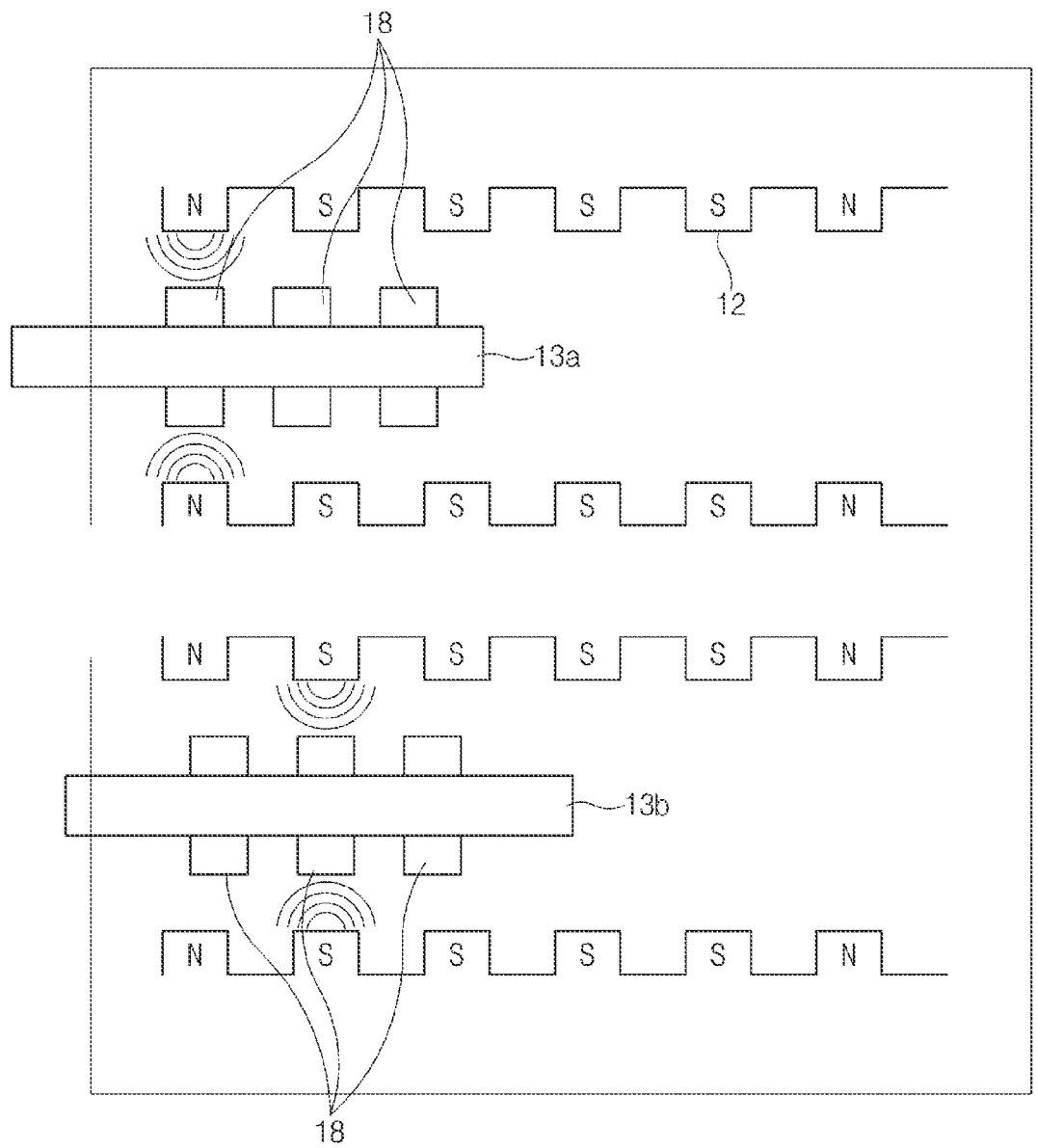
FIG. 5 is a view showing a form in which the flush between the vehicle body panel and the door panel of the zero flush system according to the present invention is sensed.
Figure 6:
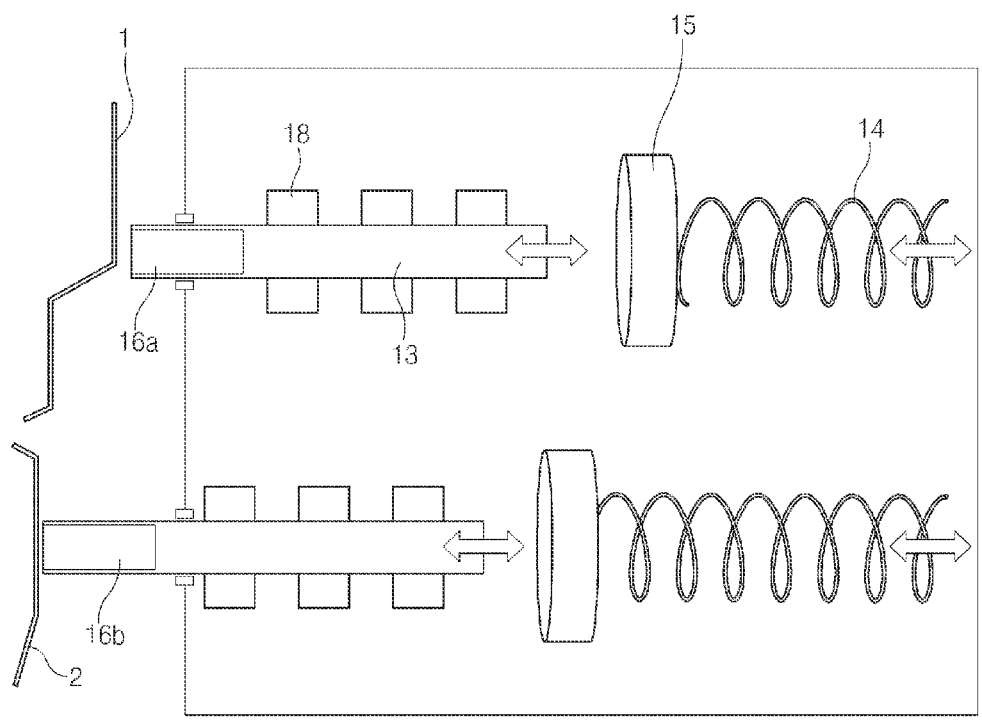
FIG. 6 is a view showing a form in which positions correspond to curved surfaces of the vehicle body panel and the door panel of the zero flush system according to the present invention.
Figure 7:
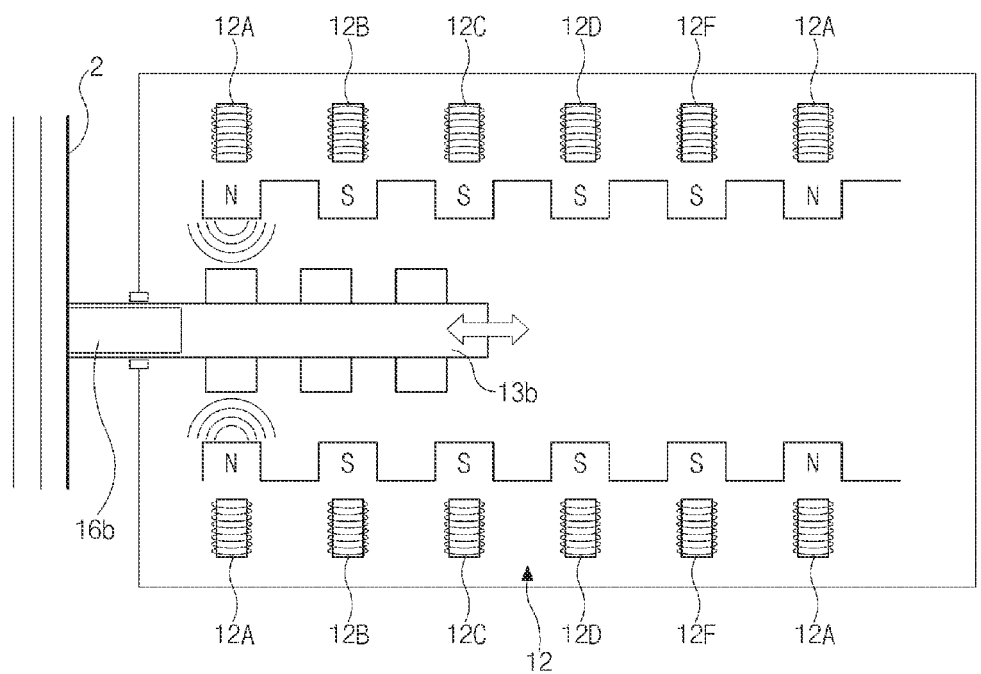
FIG. 7 is a view showing a form in which the door panel of the zero flush system according to the present invention is seized and transferred.
Figure 8:
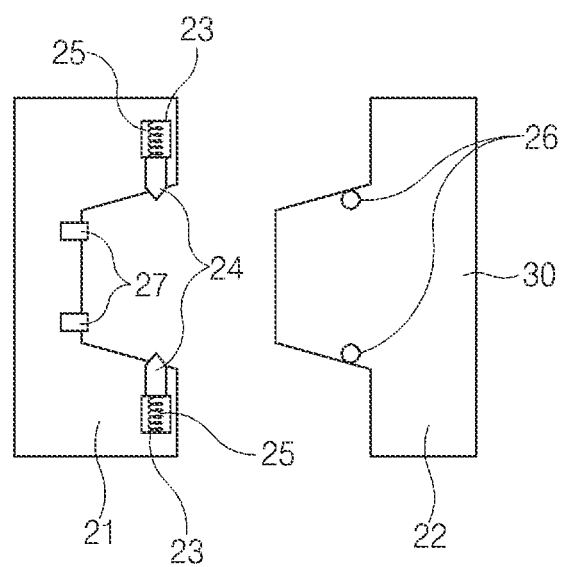
FIG. 8 is a view showing a jointing device of the zero flush system according to the present invention.

FIG. 2 is a view showing a zero flush system according to various embodiments of the present invention for measuring a flush between a vehicle body panel 1 and a door panel 2; FIG. 3 is a schematic cross-sectional view showing the zero flush system according to various embodiments of the present invention; FIG. 4 is a detailed view of the part A of FIG. 3; FIG. 5 is a view showing a form in which the flush between the vehicle body panel 1 and the door panel 2 of the zero flush system according to various embodiments of the present invention is sensed; FIG. 6 is a view showing a form in which positions correspond to curved surfaces of the vehicle body panel 1 and the door panel 2 of the zero flush system according to various embodiments of the present invention; FIG. 7 is a view showing a form in which the door panel 2 of the zero flush system according to various embodiments of the present invention is seized and transferred; and FIG. 8 is a view showing a jointing device 20 of the zero flush system according to various embodiments of the present invention.

As shown in FIG. 3, the zero flush system 10 according to various embodiments of the present invention is configured to include a body 11 provided with a plurality of transfer paths 17a and 17b, a plurality of solenoid bars 13a and 13b reciprocatably inserted into the transfer paths 17a and 17b and having one end closely adhered to the vehicle body panel 1 or the door panel 2, a plurality of solenoids 12 disposed in the transfer paths 17a and 17b and transferring the solenoid bars 13a and 13b at the time of applying power thereto, and a control device 60 controlling the transfer of the solenoid bars 13a and 13b.

The body 11, which supports the entire zero flush system 10, includes a first transfer path 17a formed at one side thereof so as to penetrate therethrough from the rear side thereof toward the front side thereof in a length direction and a second transfer path 17b formed at the other side thereof so as to be symmetrical or substantially symmetrical to the first transfer path 17a.

The first and second transfer paths 17a and 17b are provided with the plurality of solenoids 12. The plurality of solenoids 12 are disposed in a length direction of the first and second transfer paths 17a and 17b. The first transfer path 17a, which is formed to penetrate through the body 11 in a front and rear direction of the body 11, includes a first solenoid bar 13a inserted thereinto. The second transfer path 17b, which is formed to penetrate through the body 11 in the front and rear direction of the body 11, includes a second solenoid bar 13b inserted thereinto, similar to the first transfer path 17a.

A first permanent magnet 16a is mounted at a front end portion of the first solenoid bar 13a. Therefore, the first permanent magnet 16a may be closely adhered to and contact the vehicle body panel 1 made of a metal. In addition, a second permanent magnet 16b is also mounted at a front end portion of the second solenoid bar 13b. Therefore, the second permanent magnet 16b may be closely adhered to and contact the door panel 2 made of a metal.

The first and second solenoid bars 13a and 13b include a plurality of electromagnet pieces 18 protruding on an outer peripheral surface thereof in the length direction. Due to the electromagnet pieces 18 and the solenoids 12 disposed in the length direction of the first transfer path 17a, the first and second solenoid bars 13a and 13b are magnetically floated and are transferred by polarities of the solenoids 12 at the time of applying a current to the solenoids 12. In addition, positions between the plurality of electromagnet pieces 18 and the solenoids 12 are sensed to measure positions of the vehicle body panel 1 and the door panel 2. The positions of the vehicle body panel 1 and the door panel 2 are compared with each other, such that a flush between the vehicle body panel 1 and the door panel 2 may be measured.

The plurality of solenoids 12 are provided with power supplying units connected thereto, respectively. The power supplying unit applies power to the solenoids 12 by signals from the control device 60 to control polarities of the respective solenoids 12.

For example, as shown in FIG. 4, the power supplying unit controls first solenoids 12A disposed at the frontmost portion of upper and lower portions to have an N pole and controls second solenoids 12B disposed at the rear of the first solenoids 12A to have an S pole. When the polarities of the solenoids are controlled as described above, the first and second solenoid bars 13a and 13b are magnetically floated by repulsive force between the electromagnet and the first solenoid 12A having the N pole. At the same time, attractive force acts between the electromagnet and the solenoid 12B having the S pole. Therefore, the first or second solenoid bar 13a or 13b including the electromagnet pieces 18 is magnetically floated to thereby be transferred in a non-contact state and is withdrawn from the first or second transfer path 17a or 17b.

The control device 60 controls an electrode of the solenoid 12 so that the first or second solenoid bar 13a or 13b is transferred to a desired position.

Meanwhile, a rear end portion of the first solenoid bar 13a is provided with an elastic member 14 providing restoring force to the first solenoid bar 13a. The elastic member 14 is provided at the rear end portion of the first solenoid bar 13a so that elastic force acts, thereby allowing the first or second solenoid bar 13a or 13b to be self-positioned by the restoring force and the elastic force, and a buffering member 15 buffers impact depending on movement. The buffering member 15 is provided between the elastic member 14 and the first solenoid bar 13a and buffers impact or serves as a brake when the first solenoid bar 13a moves.

In addition, similar to the first solenoid bar 13a, a rear end portion of the second solenoid bar 13b is provided with an elastic member 14 providing restoring force to the second solenoid bar 13b. A buffering member 15 is provided between the elastic member 14 and the second solenoid bar 13b and buffers impact or serves as a brake when the second solenoid bar 13b moves.

The control device 60, which is provided outside the body 11, controls the polarities of the solenoids 12 so that the first and second solenoid bars 13a and 13b are transferred into the first and second transfer paths 17a and 17b in order to make the flush between the vehicle body panel 1 and the door panel 2 zero based on a sensing signal. In addition, the control device 60 receives contact information between the zero flush system 10 and a robot 30 from a joint device 20 to be described below.

The zero flush system 10 is detachably mounted at the robot 30 by the jointing device 20 as shown in FIG. 8. The jointing device 20 includes a first jointing part 21 mounted at the rear of the body 11 and provided with a jointing groove and a second jointing part 22 mounted at a distal end of the robot 30 and detachably mounted at the jointing groove 21.

Referring to FIG. 8, in order to fix the jointing between the first and second jointing parts 21 and 22, an inner peripheral surface of the first jointing part 21 is provided with fastening grooves 23, which are provided with fixing pieces 24 that are slidable. An inner side of the fastening grooves 23 is provided with springs 25 so that the fixing piece 24 is directed toward an outer side of the fastening groove 23, and the second jointing part 22 is provided with fixing grooves 26 into which the fixing pieces 24 are inserted. The fastening grooves 23 and fixing grooves 26 are provided in plural and increase jointing and fixing force between the first and second jointing parts 21 and 22.

In addition, the other side of the jointing groove of the first jointing part 21 may be provided with a contact sensor 27 sensing the jointing between the first and second jointing parts 21 and 22 when the first jointing part 21 is jointed to the second jointing part 22. Therefore, the contact sensor 27 may prevent a phenomenon that an accurate flush value is not obtained since one side is not appropriately fixed when the flush between the vehicle body panel 1 and the door panel 2 is measured.

A zero flush method using the zero flush system 10 configured as described above will be described with reference to the accompanying drawings. The zero flush method includes a disposing step of disposing the zero flush system 10 at an interface between the vehicle body panel 1 and the door panel 2; a close adhering step of closely adhering the solenoid bars 13a and 13b to the vehicle body panel 1 and the door panel 2; a measuring step of measuring, by the control device 60, a flush between the vehicle body panel 1 and the door panel 2 by sensing between the plurality of solenoids 12 of the zero flush system 10 and electromagnets of the solenoid bars 13a and 13b; and a transferring step of transferring the solenoid bars 13a and 13b so as to make the flush between the vehicle body panel 1 and the door panel 2 zero. The zero flush method further include, before the disposing step, a robot mounting step of mounting the zero flush system 10 at the robot 30 by the jointing device 20.

The robot mounting step includes a mounting sensing step of sensing a jointed state between the zero flush system 10 and the robot 30 by the contact sensor 27 confirming a contact state of the jointing device 20.

More specifically, as shown in FIG. 5, the zero flush system 10 is first disposed so as to be perpendicular or substantially perpendicular to the interface between the vehicle body panel 1 and the door panel 2. Then, the zero flush system 10 is jointed to the robot 30 using the jointing device 20. In this case, the control device 60 receives information on whether the first and second jointing parts 21 and 22 of the jointing device 20 are closely adhered to each other from the contact sensor 27. When the first and second jointing parts 21 and 22 are closely adhered to each other, the fixing piece 24 inside the fastening groove 23 of the first jointing part 21 is fitted into the fixing groove 26 of the second jointing part 22 to fix the jointing.

When the zero flush system 10 and the robot 30 are jointed to each other, the permanent magnet 16a of the first solenoid bar 13a is closely adhered to the vehicle body panel 1, and the permanent magnet 16b of the second solenoid bar 13b is closely adhered to the door panel 2. Then, power is applied to the solenoids 12 of the zero flush system 10 to magnetically float the first and second solenoid bars 13a and 13b and then control polarities of each of the plurality of solenoids 12 using the control device 60. Therefore, the first solenoid bar 13a is transferred in the first transfer path 17a to closely adhere the permanent magnet 16a of the first solenoid bar 13a to the vehicle body panel 1. In addition, similar to the first solenoid bar 13a, the second solenoid bar 13b is transferred in the second transfer path 17a to closely adhere the permanent magnet 16b of the second solenoid bar 13b to the door panel 2.

Then, the control device 60 measures the flush between the vehicle body panel 1 and the door panel 2 by the sensing between the plurality of solenoids 12 of the zero flush system 10 and the sensors of the solenoid bars 13a and 13b. That is, positions may be sensed by whether or not the plurality of solenoids 12 and the electromagnet pieces 18 of the solenoid bars 13a and 13b correspond to each other. The flush between the vehicle body panel 1 and the door panel 2 may be recognized based on information on the positions sensed as described above.

In order to make the flush zero using information on the flush sensed as described above, the positions of the panels are moved as shown in FIG. 7. That is, the electrodes of the solenoids 12 are controlled by the control device 60 so that the flush between the vehicle body panel 1 and the door panel 2 becomes zero to transfer the solenoid bars 13a and 13b into the first or second transfer paths 17a or 17b, thereby moving the vehicle body panel 1 or the door panel 2.

In this case, since it is easier to transfer the door panel 2 than to transfer the vehicle body panel 1, the door panel 2 may be transferred based on the position of the vehicle body panel 1 to make the flush between the vehicle body panel 1 and the door panel 2 zero. That is, the permanent magnet 16b of the second solenoid bar 13b contacts the door panel 2 to thereby be fixed thereto by magnetic force. Therefore, a switch of the control device 60 is used to allow the second solenoid bar 13b to be magnetically floated by polarities of each of the solenoids 12 and the electromagnet piece 18 of the second solenoid bar 13b and be then transferred to a desired position in the second transfer path 17b by the flush. In this case, since the door panel 2 contacts and is fixed to the second solenoid bar 13b, the door panel 2 is adjusted in a position while being moved together with the second solenoid bar 13b. Since the second solenoid bar 13b is magnetically floated by the solenoid 12 and is transferred in a non-contact state, a high precise control using the control device 60 may be performed. In addition, as shown in FIG. 2, a spatial limitation of an equipment is overcome, and interference and a process cycle time delay are not generated. Meanwhile, although the case in which the door panel 2 is moved based on the vehicle body panel 1 to make the flush zero has been described in various embodiments of the present invention, it is also possible to move the vehicle body panel 1 based on the door panel 2 to make the flush zero.

As described above, the zero flush system according to various embodiments of the present invention overcomes the spatial limitation of the equipment, does not generate the interference and the process cycle time delay, fixes the door that does not include the striker, senses the flush between the vehicle body panel and the door panel, and makes the flush zero. In addition, a magnetic floating principle, which is a non-contact scheme is used, thereby making it possible to control the step between the vehicle body panel and the door panel at a high precision.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A zero flush system comprising: a body provided with a plurality of transfer paths; a plurality of solenoid bars movably inserted into the transfer paths and a solenoid bar in the plurality of solenoid bars having one end adapted to be closely adhered to a vehicle body panel or a door panel; a plurality of solenoids disposed in the transfer paths and transferring at least one of the solenoid bars at a time of applying power to at least one of the solenoides; and a control device controlling the transferring of the solenoid bars, so as to make a flush between the vehicle body panel and the door panel zero.

2. The zero flush system according to claim 1, wherein the transfer paths include a first transfer path formed at a part meeting the vehicle body panel and a second transfer path formed at a part meeting the door panel, and
the solenoid bars include a first solenoid bar inserted into the first transfer path and a second solenoid bar inserted into the second transfer path.

3. The zero flush system according to claim 1, wherein the other end of the solenoid bar is provided with an elastic member providing elastic force.

4. The zero flush system according to claim 3, wherein a buffering member is disposed between the solenoid bar and the elastic member.

5. The zero flush system according to claim 1, wherein the one end of the solenoid bar is provided with a permanent magnet.

6. The zero flush system according to claim 1, wherein the solenoid bar includes a plurality of electromagnet pieces attached to an outer peripheral surface thereof, the electromagnet piece interacting with the solenoid to magnetically float and transfer the solenoid bar.

7. The zero flush system according to claim 1, wherein the body is detachably mounted at a robot by a jointing device.

8. The zero flush system according to claim 7, wherein the jointing device includes:
a first jointing part mounted at one side of the body and provided with a jointing groove; and
a second jointing part mounted at the robot and detachably mounted at the jointing groove.

9. The zero flush system according to claim 8, wherein
an inner peripheral surface of the jointing groove is provided with a fastening groove, wherein the fastening groove is provided with a fixing piece that is slidable and is provided with a spring providing elastic force so that the fixing piece is directed toward an outer side; and
the second jointing part is provided with a fixing groove into which the fixing piece is inserted.

10. The zero flush system according to claim 8, wherein the jointing groove is provided with a contact sensor sensing jointing between the first and second jointing parts.

11. A zero flush method comprising:
a disposing step of disposing the zero flush system according to claim 1 at an interface between a vehicle body panel and a door panel;
a close adhering step of closely adhering solenoid bars of the zero flush system to the vehicle body panel and the door panel;
a measuring step of measuring, by a control device, a flush between the vehicle body panel and the door panel by sensing between the solenoids of the zero flush system and electromagnet pieces of the solenoid bars; and
a transferring step of transferring the solenoid bars so as to make the flush between the vehicle body panel and the door panel zero.

12. The zero flush method according to claim 11, further comprising, before the disposing step, a robot mounting step of mounting the zero flush system at a robot by a jointing device.

13. The zero flush method according to claim 12, wherein the robot mounting step includes a mounting sensing step of sensing a jointed state between the zero flush system and the robot by a contact sensor confirming a contact state of the jointing device.

14. The zero flush method according to claim 11, wherein in the transferring step, the solenoid bar contacting the door panel is withdrawn based on information measured by the control device to make the flush between the vehicle body panel and the door panel zero.

* * * * *